United States Patent
Jensen et al.

(10) Patent No.: US 11,490,068 B2
(45) Date of Patent: Nov. 1, 2022

(54) ADAPTIVE 3D-SCANNER WITH VARIABLE MEASURING RANGE

(71) Applicant: HEXAGON TECHNOLOGY CENTER GMBH, Heerbrugg (CH)

(72) Inventors: Thomas Jensen, Rorschach (CH); Michael Hermstein, Überlingen (DE); Johan Stigwall, St. Gallen (CH); Andreas Schwendener, Chur (CH); Robert Godding, Braunschweig (DE); Peter Münstermann, Constance (DE)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 7 days.

(21) Appl. No.: 17/098,113

(22) Filed: Nov. 13, 2020

(65) Prior Publication Data

US 2021/0152810 A1    May 20, 2021

(30) Foreign Application Priority Data

Nov. 15, 2019  (EP) .................................... 19209464

(51) Int. Cl.
*H04N 13/246*    (2018.01)
*G06T 7/521*    (2017.01)
(Continued)

(52) U.S. Cl.
CPC ........... *H04N 13/246* (2018.05); *G06T 7/521* (2017.01); *G06T 7/593* (2017.01); *G06T 7/85* (2017.01);
(Continued)

(58) Field of Classification Search
CPC .... H04N 13/246; H04N 13/239; G06T 7/521; G06T 7/85
(Continued)

(56) References Cited

U.S. PATENT DOCUMENTS

| 5,402,582 A | 4/1995 | Raab |
| 10,514,256 B1 * | 12/2019 | Kamarshi ................ G01C 3/08 |

(Continued)

FOREIGN PATENT DOCUMENTS

| DE | 43 25 337 | 2/1994 |
| DE | 43 25 347 | 2/1994 |

(Continued)

OTHER PUBLICATIONS

Windecker R et al, "Three-Dimenstional Topometry with stereo Microscopes" Optical Engineering, Soc. Of Photo-Optical Instrumentation Engineers, Bellingham. Dec. 1, 1997.

(Continued)

*Primary Examiner* — Amir Shahnami
(74) *Attorney, Agent, or Firm* — Maschoff Brennan (57) ABSTRACT

A triangulation scanner having a projection unit, at least one first image acquisition unit and one second image acquisition unit and a control and processing unit for deriving distance measured values from image information. The scanner comprises a third image acquisition unit and a fourth image acquisition unit and an acquisition zoom functionality for activating or reading out the sensors such that a respective first acquisition state and a respective second acquisition state can be provided for each sensor. The acquisition of an image corresponding to a field of view defined by the respective acquisition zoom level is provided by each such acquisition zoom level thus definable, wherein the fields of view are each different.

15 Claims, 3 Drawing Sheets

(51) Int. Cl.
  *G06T 7/80* (2017.01)
  *G06T 7/593* (2017.01)
  *H04N 13/239* (2018.01)
  *H04N 5/232* (2006.01)
(52) U.S. Cl.
  CPC ....... *H04N 5/23296* (2013.01); *H04N 13/239* (2018.05); *G06T 2207/10012* (2013.01)
(58) Field of Classification Search
  USPC .......................................................... 348/47
  See application file for complete search history.

(56) References Cited

U.S. PATENT DOCUMENTS

| | | | |
|---|---|---|---|
| 2002/0030675 A1* | 3/2002 | Kawai | H04N 13/178 345/204 |
| 2013/0208098 A1* | 8/2013 | Pujol Alcolado | G06T 7/593 348/47 |
| 2014/0071458 A1 | 3/2014 | Nakatsukasa | |
| 2014/0078490 A1 | 3/2014 | Higo et al. | |
| 2014/0267619 A1 | 9/2014 | Bridges | |

FOREIGN PATENT DOCUMENTS

| | | |
|---|---|---|
| DE | 10 2004 026 090 | 12/2005 |
| DE | 102014019671 A1 | 6/2016 |
| DE | 102018108874 A1 | 10/2019 |
| DE | 112014001459 B4 | 10/2019 |
| EP | 1 474 650 A2 | 11/2004 |
| EP | 3 258 211 | 12/2017 |
| WO | 2011/000435 | 1/2011 |

OTHER PUBLICATIONS

European Search Report dated Jun. 17, 2020 as received in application No. 19209464.

* cited by examiner

ADAPTIVE 3D-SCANNER WITH VARIABLE MEASURING RANGE

CROSS-REFERENCE TO RELATED APPLICATIONS

This application claims priority to European Patent Application No. 19209464.7, filed on Nov. 15, 2019. The foregoing patent application is herein incorporated by reference.

FIELD OF THE INVENTION

The invention relates to a 3D scanner for measuring object surfaces using specific zoom functionalities.

BACKGROUND

The need exists in many technical areas of application to measure objects with high accuracy or with respect to their composition. This applies in particular to the manufacturing industry, for which measuring and checking surfaces of workpieces is highly important, in particular also for the purposes of quality control.

Coordinate measuring machines, for example, which enable a precise measurement of the geometry of an object surface, typically at micrometer accuracy, are used for such applications. Objects to be measured can be engine blocks, transmissions, and tools, for example. Known coordinate measuring machines measure the surface by establishing a mechanical contact and scanning the surface. Examples thereof are gantry measuring machines as described, for example, in DE 43 25 337 or DE 43 25 347. Another system is based on the use of an articulated arm, the measuring sensor of which, which is arranged at the end of the multipart arm, can be moved along the surface. Generic articulated arms are described, for example, in U.S. Pat. No. 5,402,582 or EP 1 474 650.

A further example of a generic system for measuring object surfaces for the purpose of manufacturing control is a triangulation scanner. As a measuring method, triangulation enables, in general, the rapid and precise scanning of a surface. Such measuring systems are described, for example, in DE 10 2004 026 090 A1 and WO 2011/000435 A1.

A measuring system based on the principle of strip projection represents a special form of the triangulation scanner. Such a measuring device typically has a projector and two cameras, which enable a respective acquisition of a pattern projected by means of the projector at different angles. Such systems are known, for example, from EP 3 258 211 A1 or US 2014/0078490 A1.

Triangulation scanners offer the advantage of nondestructive, because it is contactless, surface measurement with comparatively high measurement accuracy and rapid measurement progress at the same time.

Coordinate surface measurement permits geometric deviations on the workpiece from corresponding target values to be established. In this regard, a high-accuracy specification can thus be made for the manufacturing precision or manufacturing quality. It can thus be established whether shape and dimensioning of the produced part are within a predetermined tolerance and the component is to be considered a discard or good part.

Stereo 3D scanners typically have a defined measurement volume, within which a surface measurement is reliably possible. In other words, the distance between the measuring device and the surface has to correspond to a specific measurement distance from a permissible distance range. The measurement volume is delimited laterally in relation to the distance by the lateral measuring range (measurement field). In such devices, the measurement distance has to be maintained accordingly in each case, for example, for different objects or objects having complex surface geometry and the lateral measuring range is thus given.

However, measuring devices are also known which can provide different measuring ranges. For this purpose, the objectives of both the camera and also the projector have to be changed. This exchange is to be carried out manually by a user. A recalibration of the cameras in relation to one another has to take place accompanying this. This sequence results in a measurement interruption and thus a disadvantageous lengthening of the total measuring time and moreover only has limited suitability for automated use.

BRIEF DESCRIPTION OF THE INVENTION

It is therefore the object of some aspects of the present invention to specify a device which provides an improved object check by means of triangulation.

In particular, it is the object of the invention to propose a compact device which provides improved flexibility with respect to measuring objects.

A further object of some aspects of the invention is to provide a measuring device having an improved measuring range, in particular with respect to the overlap of the camera fields of view.

These objects are achieved by the implementation of the characterizing features of the independent claims. Features which refine the invention in an alternative or advantageous manner can be inferred from the dependent claims.

The goal of some aspects of the present invention is to provide an adaptive 3D scanner, which permits flexible measurement field adaptations with respect to size and resolution with high integrity, in particular without recalibration of the scanner, wherein an automated, user-independent use in a robot environment is moreover also enabled.

To adapt the camera-side measuring range in the object plane with constant measurement distance, in general it is necessary to change the focal length of the objective. This has heretofore been achieved by replacing the optical units (mentioned above). However, the use of a zoom optical unit is alternatively conceivable, as is known, for example, in the field of photography.

To provide a zoom design for a 3-fold scale change, for example, an arrangement having two movable lens groups is required. Tolerance analyses carried out for this purpose have shown that the reproducibility demands for the positioning of the mechanically moved lens groups entail extremely high lateral positioning accuracy. Reliable and reproducible measurements without recalibration of the system can only thus be ensured.

These high demands require a comparatively large amount of effort with respect to the implementation with comparatively high costs as well if a repeating calibration after the change of the measuring range is to be avoided (for example for robot use). The complete avoidance of positioning errors represents a central object in this case.

However, some aspects of the invention also relate to this aspect of the multiple optical zoom on the part of the camera of a triangulation sensor.

An alternative approach according to the invention is directed to the avoidance of a mechanical movement of optical elements of the camera.

Modern CMOS image sensors having small pixel sizes offer a comparatively large number of pixels (for example in the range of 50 to 120 MP having 2.2 µm pixel pitch). Using a corresponding fixed focal length optical unit, a sufficiently high resolution (for example approximately 13 MP) can still be achieved by digital zooming in or out with a reduction of the measuring range by a factor of 3, which is sufficient for a generic 3D scanner.

Upon full use of the image sensor, a 2×2 binning mode can moreover be selected, which permits a reduction of the transferable pixels by the factor 4, i.e., for example to 30 MP. The optical unit then advantageously only has to have a high resolution in the central region, which simplifies the correction of the imaging errors of the camera objective. For example, an objective having 5 lenses can be sufficient to meet the required measurement specifications. At such a solution, digital zooming can replace optical zooming using moving elements, so that a stable and reproducible adaptation of the measurement field can be ensured.

The use of such a zoom solution in a triangulation scanner having one or more cameras is generally conceivable, however, the comparatively high costs are disadvantageous in this solution, which arise in this case due to the use of correspondingly required image sensors and/or cameras.

According to some aspects of the invention, a combination of optical and digital zoom is therefore proposed, in which cameras having a lower, but sufficient number of pixels (for example in the range of approximately 20 MP) are used and still permit suitable digital zooming.

For optical zooming, a separate solution consisting of two different fixed focal length objectives is proposed.

One embodiment can have four cameras, wherein the four cameras form two camera pairs. Each camera pair has a specific overall focal length, wherein this is different for the camera pairs.

In particular, the camera objectives can be combined by means of a beam splitter, so that in each case one camera of each camera pair are combined by the beam splitter and the combined objectives observe an object to be measured from the same triangulation angle.

Some aspects of the invention thus relate to a measuring device designed as a triangulation scanner for measuring an object surface. The triangulation scanner has a projection unit for projecting a pattern on the object surface and at least one first image acquisition unit having a first sensor and one second image acquisition unit having a second sensor, wherein the first and the second image acquisition unit each have a lens assembly having a first focal length and are each aligned and designed to acquire an image depicting the pattern and to provide corresponding image information.

Moreover, a control and processing unit is provided to receive the image information and to derive distance measurement values from the image information.

The scanner thus has a projector and a first camera pair, the image data of which are received and evaluated by the control and processing unit.

The triangulation scanner furthermore has a third image acquisition unit having a third sensor and a fourth image acquisition unit having a fourth sensor, wherein the third and the fourth image acquisition unit each have a lens assembly having a second focal length and are each aligned and designed to acquire an image depicting the pattern and to provide corresponding image information.

The first focal length is less than the second focal length. The focal lengths of the first and the second camera (image acquisition unit) are thus less than the focal lengths of the third and the fourth camera.

The first and the second image acquisition unit form a first (camera) stereo pair and the third and the fourth image acquisition unit form a second stereo pair.

The triangulation scanner moreover has an acquisition zoom functionality for activating and/or reading out the image sensors in this way, so that a respective first acquisition state and a respective second acquisition state can be provided for each sensor, wherein a larger image acquisition region of the respective sensor is defined in the first acquisition state than in the second acquisition state. The sensor surface to be read out to provide respective image information can thus be varied (controlled) for each sensor.

The first and the second acquisition state of the first sensor correspond to the first and the second acquisition state of the second sensor, whereby a first and a second acquisition zoom level can be provided by the first stereo pair.

The first and the second acquisition state of the third sensor correspond to the first and the second acquisition state of the fourth sensor, whereby a third and a fourth acquisition zoom level can be provided by the second stereo pair.

Each acquisition zoom level provides the acquisition of an image corresponding to a field of view (on the object) defined by the respective acquisition zoom level, wherein the fields of view are each different. In particular, the fields of view differ with respect to size and/or location on the object at equal measurement distances or uniform measuring range in particular.

Alternatively, the measuring range, i.e. a permissible distance range for carrying out measurements, for the second camera pair having a greater focal length is in particular less than that for the first camera pair. The measurement distances, i.e. the distances of the camera pairs to an object, in particular along the optical axes, can be equal. Alternatively, the second pair can have a lesser measurement distance, whereby a triangulation angle and thus the precision are increased.

In one embodiment, the triangulation scanner has an acquisition switching functionality configured in such a way that upon execution of the acquisition switching functionality by a manual or automatic deliberate selection, a specific acquisition zoom level is set.

In particular, upon the selection of the first acquisition zoom level, the image acquisition is provided by means of the first stereo pair in the first acquisition state. Upon selection of the second acquisition zoom level, the image acquisition is provided by means of the first stereo pair in the second acquisition state, upon selection of the third acquisition zoom level, the image acquisition is provided by means of the second stereo pair in the first acquisition state, and upon selection of the fourth acquisition zoom level, the image acquisition is provided by means of the second stereo pair in the second acquisition state.

A camera arrangement having four defined zoom levels for object measurement can be provided by such an adaptation and association of the digital zoom levels (acquisition zoom levels) and the optical zoom levels (focal lengths).

In one embodiment, the field of view associated with the second acquisition zoom level can be smaller than the field of view associated with the first acquisition zoom level. Moreover, the field of view associated with the third acquisition zoom level is smaller than the field of view associated with the second acquisition zoom level and the field of view associated with the fourth acquisition zoom level is smaller than the field of view associated with the third acquisition zoom level.

The adaptation is set here so that an increasing reduction of the field of view (on the object) is given by the first to the fourth acquisition zoom level.

In one embodiment, the acquisition zoom functionality can be configured in such a way that for the first, the second, the third, and the fourth sensor respectively the same first acquisition state and respectively the same second acquisition state can be provided. In other words, upon switching from the first acquisition state into the second acquisition state, an equal (percentage) reduction of the image acquisition region used on the sensor takes place in each case.

In one embodiment, the optical axis of the first image acquisition unit can be aligned in parallel or coaxially to the optical axis of the third image acquisition unit.

Correspondingly, the optical axis of the second image acquisition unit can alternatively or additionally be aligned in parallel or coaxially to the optical axis of the fourth image acquisition unit.

In particular, the triangulation scanner has a beam splitter and the first and the third and/or the second and the fourth image acquisition unit are aligned in relation to the beam splitter in such a way that the respective corresponding optical axes are aligned in parallel or coaxially.

According to one embodiment, the projection unit can have a zoom assembly, which can be variably positioned along its optical axis in particular, for providing at least two optical projection focal lengths. Furthermore, the projection unit can have a projection element defining a projection area for variable and controlled light emission. The triangulation scanner can moreover have a projection zoom functionality for activating the projection element in such a way that upon execution of the projection zoom functionality, a first and a second projection state can be provided, wherein a larger projection field of view is provided in the first projection state than in the second projection state.

For this purpose, for example, the actively and selectively controllable projection surface of a DLP or DMD (digital mirror device) is activated accordingly. To provide the first projection state, a larger surface of the DLP or DMD can accordingly be activated for pattern projection than for the second projection state.

In particular, to provide the second projection state, controlled by the projection zoom functionality, a smaller light emission region of the projection surface, in particular an inner subregion, can be activated for the pattern generation than to provide the first projection state.

In such an operation of the projector, the pixels of an inner surface region are activated accordingly, wherein the illumination pixels remain dark (inactive) in an edge region around the inner region.

Using a projector configuration having mechanically adjustable zoom element together with a digital projection element as described, the first and the second projection state (digital projector zoom) can be provided for each optical projection focal length (optical projector zoom). A multi-level projector zoom can be implemented by an adapted combination of these zoom variants.

In one embodiment, a first of the projection focal lengths can be greater than a second of the projection focal lengths. A first projection zoom level can be provided by setting the first projection focal length (optical zoom level) and the first projection state (digital zoom level). A second projection zoom level can be provided by setting the first projection focal length and the second projection state, a third projection zoom level can be provided by setting the second projection focal length and the first projection state, and a fourth projection zoom level can be provided by setting the second projection focal length and the second projection state.

In one embodiment, the triangulation scanner can have a projector switching functionality configured in such a way that upon execution of the projector switching functionality by a selection, one of the projection zoom levels is provided. The selection or the execution of the projector switching functionality can take place manually or automatically, for example controlled by a higher-order controller. The selection can take place, for example by a user input or by a control signal.

In one embodiment, the triangulation scanner can have a measurement control functionality configured in such a way that upon its execution, a selection of the projector switching functionality and a selection of the acquisition switching functionality can take place, for example due to a user input or a control command, adapted in such a way that the first acquisition zoom level and the first projection zoom level as the first measurement setting,
the second acquisition zoom level and the second projection zoom level as the second measurement setting,
the third acquisition zoom level and the third projection zoom level as the third measurement setting, and
the fourth acquisition zoom level and the fourth projection zoom level as the fourth measurement setting can be provided, wherein the provision of the respective acquisition zoom level and the respective projection zoom level of a measurement setting takes place in a chronologically adapted, in particular chronologically overlapping, in particular simultaneous manner.

The measurement control functionality or its selections can take place, for example manually or automatically, for example controlled by a higher-order controller, for example by a user input or by a control signal.

The measurement control functionality in conjunction with the specific camera and projector design thus provides a measuring device which, in each case adapted to a selected enlargement, provides both a matching projection, i.e. in particular a size and/or resolution of the pattern projection, and also a matching image acquisition. In other words, a present field of view of the projector, i.e. an illuminated surface on the object, and the present fields of view of the cameras with respect to size and overlap can each be provided matched and adapted to one another.

Some aspects of the invention also relate to a triangulation scanner for measuring an object surface, having a projection unit for projecting a pattern on the object surface and having a first image acquisition unit having a first sensor and a first lens assembly.

The first image acquisition unit is aligned and designed to acquire an image depicting the pattern and to provide corresponding image information. The scanner moreover comprises a control and processing unit to receive the image information and to derive distance measured values from the image information.

The first lens assembly has at least one first zoom lens group, which can be positioned variably and with high precision along its optical axis, for providing at least two optical acquisition focal lengths, whereby at least one first and one second acquisition zoom level can be provided.

Each acquisition zoom level provides the acquisition of an image corresponding to a field of view defined by the respective acquisition zoom level, wherein the fields of view are each different.

In a further embodiment, the triangulation scanner has a second image acquisition unit having a second sensor and a second lens assembly. The first and the second image acquisition unit form a first stereo pair. The first and the second lens assembly each have at least one first zoom lens group, which can be positioned variably and with high precision along its optical axis, for providing at least two optical acquisition focal lengths, whereby a first and a second acquisition zoom level are provided for the first stereo pair. Each acquisition zoom level provides the acquisition of an image corresponding to a field of view defined by the respective acquisition zoom level and the fields of view are each different.

In contrast to the preceding embodiment of the triangulation scanner, four cameras are not provided here for providing two stereo pairs, but rather the first stereo pair moreover provides a quasi-second stereo pair by way of the mechanical optical zoom arrangement.

In one embodiment, the first and the second lens assembly each have a further second zoom lens group, which can be positioned variably and with high precision along its optical axis, for providing a total of at least three optical acquisition focal lengths, whereby at least one third acquisition zoom level is provided for the camera pair (stereo pair).

By way of such a variant, a multilevel zoom is implementable by means of multiple optical lens groups, which can be adjusted and positioned solely mechanically.

In one embodiment of an above-described triangulation scanner having a projection unit for projecting a pattern on the object surface, having at least one first image acquisition unit having a first sensor and a first lens assembly and having at least one second image acquisition unit having a second sensor and a second lens assembly, the first and/or the second image acquisition unit can be designed in such a way that its sensor and its lens assembly are positioned so that a sensor center point of the sensor is offset in relation to the optical axis of the lens assembly, so that a distance a>0 is provided from the sensor center point to the optical axis.

In particular, the optical axes of the first and the second lens assembly or the first and the second image acquisition unit can be aligned in parallel. A solely lateral offset of the acquirable object region is achieved in this way. In other words: the acquirable region is laterally displaced in the object plane.

According to one embodiment, an eccentric displacement of the object region (field of view) in relation to the optical axis can result and the offset (of the sensor) can be set in such a way that object regions defined by the fields of view of the first and the second image acquisition unit in an object plane essentially correspond, in particular completely overlap.

In one embodiment, a uniform pixel grid in the object plane for the first and the second image acquisition unit can be provided in this way.

In particular, an orientation of the pixels associated with the first image acquisition unit in the object plane and an orientation of the pixels associated with the second image acquisition unit in the object plane can be the same.

According to one embodiment, the first image acquisition unit and the second image acquisition unit can be referenced in a common external coordinate system, wherein the referencing is (only) provided by a translational transformation. A uniform common voxel grid for the first and the second image acquisition unit can be provided in this way.

BRIEF DESCRIPTION OF THE DRAWINGS

The method according to some aspects of the invention and the device according to the invention are described in greater detail solely by way of example hereinafter on the basis of specific exemplary embodiments schematically shown in the drawings, wherein further advantages of the invention are also described. In the specific figures.

DETAILED DESCRIPTION

Figure 1:
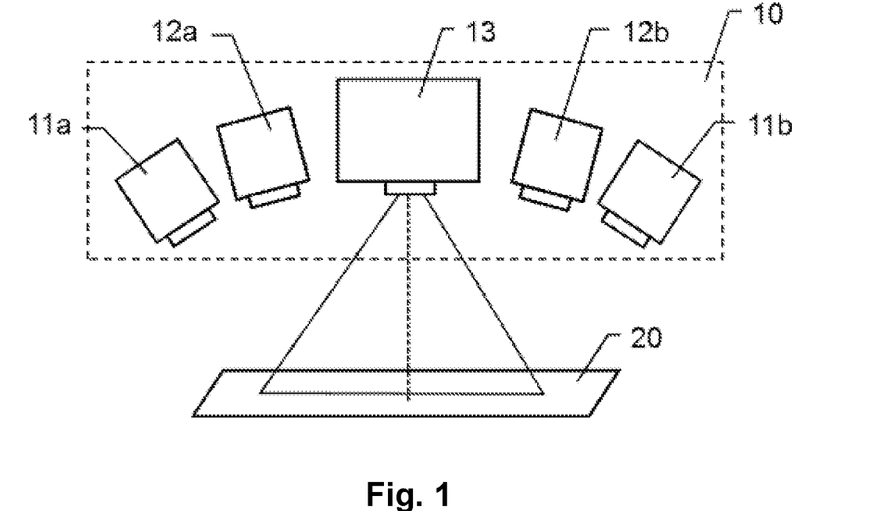
FIG. 1 schematically shows one embodiment of a measuring device according to the invention.

FIG. 1 shows an embodiment of a measuring device 10 according to the invention for measuring an object 20. The measuring device 10 has a projection unit 13 and four image acquisition units 11a,11b,12a,12b. The projection unit 13 and the image acquisition units 11a,11b,12a,12b are each arranged in a known position and orientation in relation to one another.

The projection unit 13 defines an optical axis and a field of view, within which a light projection can be oriented onto the object 20 to be measured. A defined projection of the object 20 can thus be produced.

The projector 13 can be arranged centrally between the cameras 11a,11b,12a,12b or alternatively (not shown) laterally offset. The projector 13 can moreover preferably be aligned at the smallest possible angle in relation to the object 20.

The cameras 11a,11b,12a,12b are aligned in such a way that each of the cameras can accurately acquire and resolve the light projection that can be provided by the projector 13 in a specific measuring range. Reference is made here as the measuring range to a distance range between the measuring device 10 and the object 20. The distance range typically results from a depth range around the object plane 20.

The four cameras 11a,11b,12a,12b form two stereo pairs. The cameras 11a and 11b form a first stereo pair, and the cameras 12a and 12b form a second stereo pair. Each stereo pair enables the acquisition of the light projection simultaneously using two cameras. In an alternative arrangement (not shown), the cameras of a camera pair can be positioned not symmetrically around the projector, but rather can be arranged both on one side, for example.

The cameras 11a and 11b each have a first objective having a first fixed focal length, i.e., the cameras 11a and 11b have the same focal length and are thus designed for stereoscopic image acquisition for a measuring range defined by the focal length.

In particular, an objective having fixed focal length is provided which provides a maximum FOV (Field Of View) of 100% in combination with a 20 MP (Mega Pixel) image sensor. The field of view relates to the region which is acquirable on the object. Since typically the full resolution of 20 MP is not required for the measuring system 10 for routine measurement tasks, in particular a data reduction is executed (by binning on the sensor or in the software/in the camera driver), for example to 65% of the full resolution, i.e., for example to 13 MP. This image acquisition upon use of a camera field of view (image acquisition region) of 100% using the first stereo pair forms a first (acquisition) zoom level of the device 10.

For a second (acquisition) zoom level, the sensor permits digital zooming within the maximum image acquisition region due to its relatively large number of pixels. For this purpose, for example, it is possible to zoom into the central region, wherein a reduction of the field of view, for example, to approximately 66% with a corresponding image output (for example of 9 MP) is provided. The zooming can take place by means of targeted selection of an acquisition region (ROI, region-of-interest). The selection can take place on the sensor itself or by means of the software/camera driver.

The cameras 12a and 12b each have a second objective having a second fixed focal length, i.e. the cameras 12a and 12b each have the same focal length and are thus also designed for stereoscopic image acquisition for a different measuring range defined by the different focal length.

A third zoom level can thus be achieved by a further reduction of the field of view by switching to the second stereo pair. The focal lengths of the second objectives are greater than the focal lengths of the first objectives. The field of view acquirable on the object is reduced in this way, for example, to approximately 44%. For the acquisition of the reduced field of view, in the third (acquisition) zoom level, preferably the maximum image acquisition region of the sensors of the cameras 12a and 12b is used. A data reduction can also take place here due to the large number of available sensor pixels (for example to approximately 13 MP).

A fourth (acquisition) zoom level can in turn be provided by digital zooming by means of the second stereo pair. This corresponds to the greatest enlargement for this embodiment. For the cameras of the second stereo pair, a smaller image acquisition region can accordingly be selected here, whereby a reduction of the field of view on the object 20 is provided. The reduction can take place, for example, to 30% of the first zoom level. According to the principle of the second zoom level, for example, it is possible to zoom into the central region, wherein a reduction of the image acquisition region on the sensor to, for example, approximately 66% with a corresponding image output (for example of 9 MP) is provided. The zooming can be carried out by means of deliberate selection of an acquisition region (ROI, region-of-interest). The selection can take place on the sensor itself or by means of the software/camera driver.

A four-level (acquisition) zoom operation of the measuring device 10, which covers a 3-fold zoom range, is thus achievable at acceptable costs. Since moreover no moving components are provided, a very high level of reproducibility and thus robustness and reliability of the zoom levels can be ensured. Recalibration between switching the zoom levels is not required here.

The switching between the zoom levels can moreover take place quasi-instantaneously, whereby a faster measurement sequence can be provided.

A further significant advantage of this system 10 is the possibility of an additional verification of the measurement recordings by simultaneous data acquisition and evaluation using the second camera pair, while a scan is carried out using the first camera pair. The pattern projected by the projector can be recorded using the first and simultaneously using the second camera pair.

In comparison to zoom objectives, the fixed focal length objectives have no moving parts. This permits the very high level of reproducibility with respect to the provision of the zoom levels.

Due to the use of two fixed focal lengths, the use of an optical two-level zoom can be avoided, whereby the risk of a deficient reproducibility is significantly reduced or avoided.

However, it is obvious that the invention is not restricted to providing four acquisition zoom levels, but rather also comprises providing a greater number of zoom levels. This can be achieved, for example, by the use of image sensors having comparatively small pixel sizes and a comparatively large number of pixels (for example in the range of 50 MP to 120 MP). Digital zooming can take place in this way in more than two steps, but still with sufficiently high and precise resolution.

The projection unit 13 of the triangulation scanner 10 can preferably be designed in such a way that a sinusoidal strip pattern (with respect to the intensity distribution) having a strip distance of 0.4 mm is projectable with high contrast. This enables a signal acquisition with low noise. The aperture of the projector 13 can be selected to be as large as possible, in order to only permit a low speckle contrast on rough surfaces ($R_a$<0.1 µm).

As shown, two real camera pairs (two stereo pairs with projector) are proposed as a measurement instrument in combination with structured illumination by the projector. A thermal stress of the projector does not have an effect on the measurement accuracy, since a projected pattern is always acquirable using two cameras.

For a measurement, a phase shift ("phase shifting") method can be used by means of the projector 13 by the projection of a binary pattern (GreyCode method). The phase shift provides shortwave information, and the Grey-Code provides the longwave information.

To increase the contrast, multiple frequencies can be projected in the phase shift for the longwave indexing of the space. From the beat of the sine waves of various frequencies, these can then be used as longwave information. The projection of sharp edges can be avoided in this way.

All projected images can thus have similar properties. Longwave images are not projected, which induce different diffuse internal reflections in the case of a concave object surface than the shortwave phase images.

In addition to a structured illumination (using phase shifts), the measurement method can also be operated or supplemented using a photogrammetric recording and evaluation. The projector is used in this case (only) for uniform illumination. A three-dimensional location of these features and thus coordinates can be determined on the basis of identifiable features in the object space using a beam equalization calculation or by means of stereo matching for the stereo camera arrangement.

The projection of a pattern having random intensity distribution as an artificial texture is also a variant for a measurement. The achievable lateral resolution can be lower here, however a 3D point cloud can be generated using a single synchronized recording of the two stereo cameras.

The projection unit 13 is designed for emitting a specific pattern or pattern sequence in the direction of an object 20 to be measured.

According to the invention, the projection unit 13 has a zoom assembly variably positionable along its optical axis for providing at least two optical projection focal lengths. The provision of these different focal lengths in combination with a selective projection element (light-emitting projection surface) adaptable with respect to the resolution enables, on the part of the projector 13, a setting of at least four different fields of view on the object 20. These projector fields of view can preferably be adapted to the acquisition fields of view, i.e. at least the sizes of the fields of view can be adapted to one another.

A possible shift of the projected pattern on the object 20 is acquirable simultaneously by two cameras and can thus be neglected in the 3D calculation of the point cloud. A shift of the pattern is equivalent to a general change of the starting phase of the projected sine pattern over the entire object field (phase offset). The requirement for the projector 13 with respect to reproducibility is thus lower than for the cameras.

On the other hand, a projector 13 (for example based on DLP) is relatively expensive in comparison to one of the cameras 11a-12b. In the scope of the present invention, the use of an optical two-level zoom is therefore proposed, wherein only one projector module is required.

Figure 2:
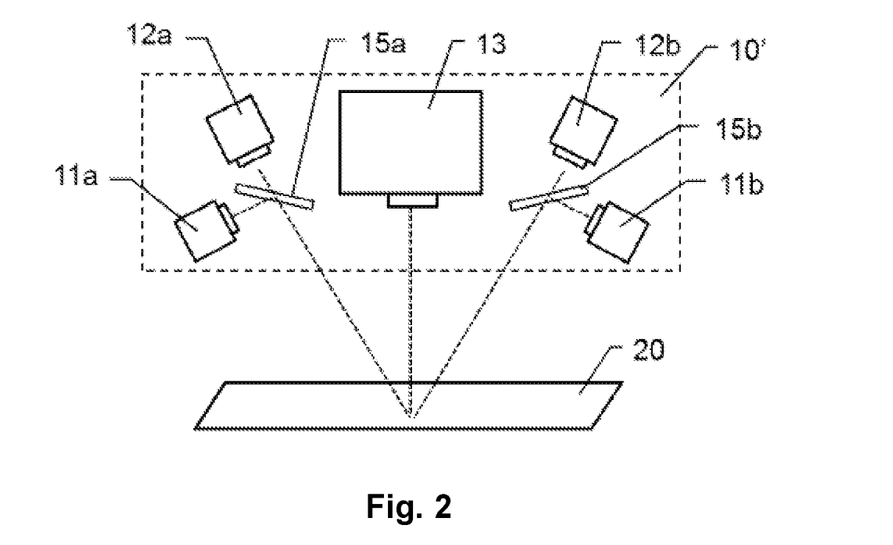
FIG. 2 shows a further embodiment of a measuring device according to the invention.

FIG. 2 shows a further embodiment of the measuring device 10' according to the invention. In contrast to the embodiment according to FIG. 1, two beam splitters 15a, 15b are provided here, which are arranged together with the cameras 11a-12b in such a way that in each case two optical camera axes are combined by one beam splitter. The optical axes of the first 11a and the third 12a camera are combined by the beam splitter 15a in such a way that they are provided coaxially in the propagation direction after the beam splitter 15a. This applies similarly to the arrangement of the cameras 11b and 11b with beam splitter 15b. Therefore, the first and the third or the second and the fourth image acquisition unit, respectively, are aligned in relation to the beam splitter in such a way that the respective corresponding optical axes are coaxially aligned.

The objectives of the combined cameras thus observe the object 20 from the same triangulation angle. Moreover, a lower space requirement and thus a more compact construction can result due to such an arrangement.

Figure 3A:
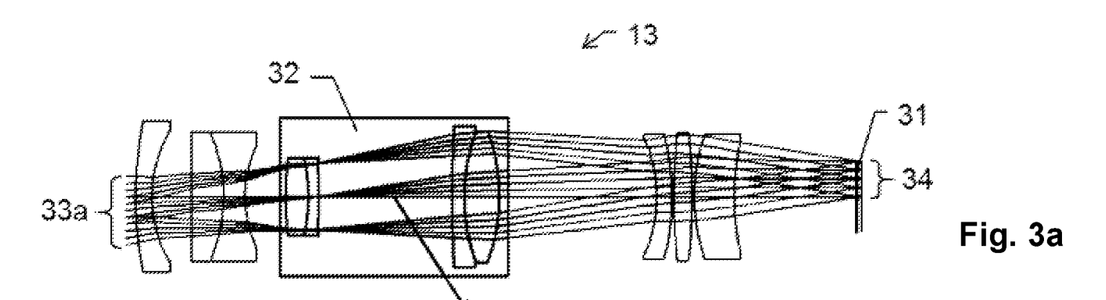
FIGS. 3a-b schematically show one embodiment of a projection unit of a checking system according to the invention.
Figure 3B:
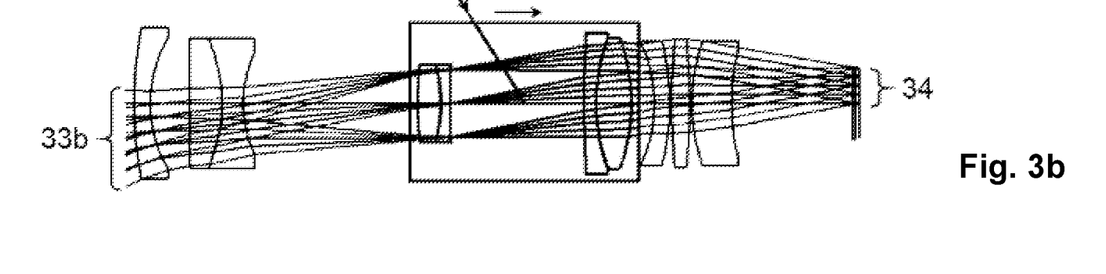

As an example, an embodiment of the projection unit 13 having a variably positionable zoom assembly 32 is shown in two different states in FIGS. 3a and 3b.

The projection unit 13 has a projection element 31 for variable and controllable light emission. The projection element 31 has a projection surface having a defined number of pixels, wherein each pixel can emit light. An emission in an upper surface part 34 is shown as an example.

FIG. 3a shows the projection unit 13 and its zoom assembly 32 having a first projection zoom level. A first focal length of the optical system is provided by the positioning shown of the zoom assembly 32, whereby a projection of the pattern that can be emitted using the projection element 31 can be generated according to a field of view 33a.

Another positioning of the assembly 32 is shown in FIG. 3b. In this way, a lesser focal length is provided for the optical system and thus a larger field of view 33b is illuminated. The projection is accordingly imaged larger. In particular, the projection is thus sharply imaged on the object 20 for a larger measuring range (greater distance between projector 13 and object 20).

The two projection zoom levels shown can each be combined according to the invention with at least two digital projection zooms. For this purpose, the projection element 31 can be activated in such a way that a first and a second projection state can be provided, wherein a larger projection range is provided on the projection element 31 in the first projection state than in the second projection state.

A lowest projection zoom level enables the provision of an assumed maximum projection field of view of 100%. For this purpose, for example, a first projection focal length according to FIG. 3b and a first projection state (full projection region of the projection element 31) are set. In particular, a full HD projection is performed for this purpose.

For a second projection zoom level, for example, to reduce the projection field of view to 66% in the central region of the projection element 31, only 1280×720 elements are used for the projection (ROI, region-of-interest, selection on the DLP). An edge zone of the projection surface of the projection element 31 can remain black for this purpose, i.e., provide no light emission.

A third projection zoom level can be provided by moving the zoom assembly 32 into the position according to FIG. 3a (greater focal length) and setting the first projection state (full usage of the projection region of the projection element 31). A reduction of the projector field of view, for example to 44% of the maximum field of view, can in turn be achieved in this way.

A fourth projection zoom level can be provided by the combination of the greater focal length and the second projection state (partial usage of the projection region of the projection element 31).

By way of an adaptation of the control of the measuring device 10, i.e. an adaptation of the projection settings and the camera settings, the different acquisition zoom levels and the different projection zoom levels can be associated matching with one another and provided adapted in a controlled manner according to this association. As a result, this means that the set acquirable camera field of view essentially corresponds in shape and size in each case to the set projection field of view (in particular neglecting any possibly occurring optically-related and/or geometry-related distortions due to, for example a tilted relative alignment of the cameras and/or the projector).

Each camera of one or both of the camera pairs 11a,11b and 12a,12b can be in a Scheimpflug arrangement (fulfilling the Scheimpflug condition) in relation to the projector 13 with respect to the measurement plane. In particular, the image sensors of the cameras and/or a projection mask in the projector 13 are in a Scheimpflug arrangement with respect to the measurement plane (tilted). The image sensors are arranged tilted in relation to the optical axis. A uniformly sharp projection of the mask and also its image from the checking plane on the image sensors can thus be generated. In particular for the projection objective, an opening of an aperture (low f-stop) having a greater light yield and numeric aperture (NA) can thus be enabled. The camera objective can have a smaller aperture. The Scheimpflug arrangement contributes decisively to fulfilling high resolution demands.

The Scheimpflug condition generally states that in the case of optical imaging, image plane, objective plane, and plane of focus intersect in a common straight line. The desired object plane can then be imaged with maximum sharpness. The sharply imaged object plane referred to as the plane of focus can thus be an inclined plane if either the objective plane or the image plane of a camera is inclined.

Figure 4:
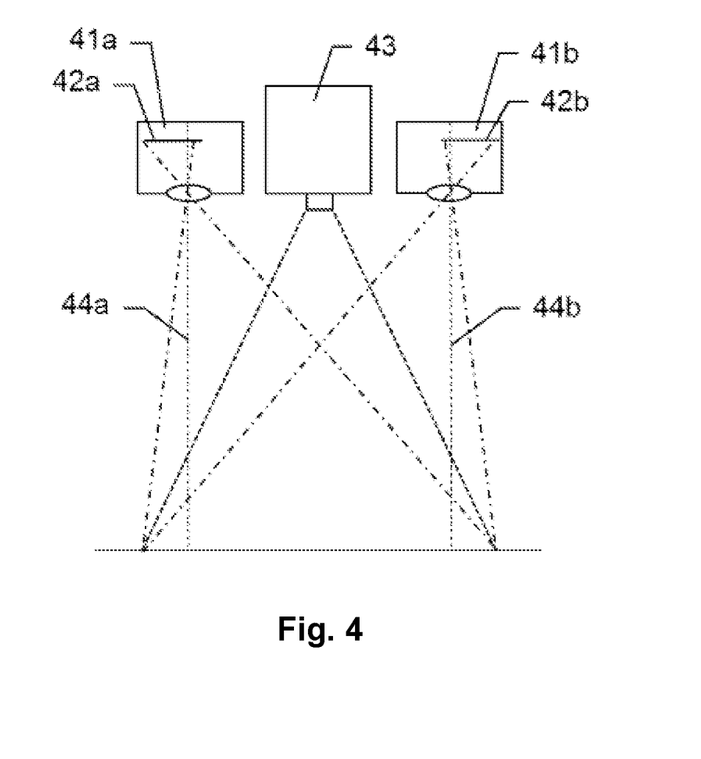
FIG. 4 shows a further embodiment of a measuring device according to the invention.

FIG. 4 shows a further embodiment of a triangulation scanner according to the invention having a projector 43 and two cameras 41a and 41b.

The sensors 42a and 42b of the cameras are offset in relation to their respective optical axis 44a and 44b in such a way that the optical axis 44a,44b does not intersect the sensor center point, but rather there is a distance >0 between sensor center point and optical axis. The optical axes 44a, 44b, which are defined by the respective optical assemblies (lens groups), are aligned in parallel to one another.

The respective fields of view of the cameras are displaced accordingly by such a displacement of the sensors 42a,42b. The center points of the acquirable object regions are thus offset in relation to the optical axes. Due to the parallelism of the optical axes 44a,44b, a trapezoidal distortion can be avoided by the displacement of the sensors, whereby solely a lateral displacement of the acquirable object region is effectuated.

The optical axis of the projector 43 is in particular also aligned in parallel to the optical axes 44a,44b.

Due to the opposing displacement direction of the sensors in this embodiment, a substantially corresponding object region can thus be provided on the object plane for both cameras, i.e. both cameras acquire essentially the same region (area) in the object plane. It is advantageous in this embodiment that a uniform pixel grid and a uniform voxel grid can be jointly provided for both cameras 41a,41b. The external coordinate systems of the cameras 41a,41b moreover correspond in their alignments, i.e. they can be oriented identically. Referencing of these coordinate systems can thus be carried out solely by a translational transformation.

It is obvious that the aspect of an offset sensor as shown in FIG. 4 is not solely restricted to this embodiment, but rather is combinable according to the invention with embodiments of the invention already described, in particular with the embodiments of FIGS. 1 to 3. In other words: a sensor offset out of the optical axis can be used both with an optical zoom and also with a digital zoom.

Moreover, the invention is not restricted to the displacement of the sensors of both cameras, but rather extends both to embodiments having only one offset sensor and also to embodiments having more than two offset sensors, in particular for a scanner having four cameras.

It is obvious that these illustrated figures only schematically represent possible exemplary embodiments. The various approaches can also be combined according to the invention with one another and with methods of optical object measurement by means of triangulation of the prior art.

What is claimed is:

1. A triangulation scanner for measuring an object surface comprising:
    a projection unit for projecting a pattern on the object surface;
    at least one first image acquisition unit having a first sensor and one second image acquisition unit having a second sensor, wherein the first and the second image acquisition unit each have a lens assembly having a first focal length and are each aligned and designed to acquire an image depicting the pattern and to provide corresponding image information; and
    a control and processing unit for receiving the image information and for deriving distance measured values from the image information;
    wherein:
        the triangulation scanner has a third image acquisition unit having a third sensor and a fourth image acquisition unit having a fourth sensor, wherein the third and the fourth image acquisition unit each have a lens assembly having a second focal length and are each aligned and configured to acquire an image depicting the pattern and to provide corresponding image information,
        the first focal length is less than the second focal length,
        the first and second image acquisition unit form a first stereo pair and the third and fourth image acquisition unit form a second stereo pair,
        the triangulation scanner has an acquisition zoom functionality for activating or reading the sensors such that for each sensor a respective first acquisition state and a respective second acquisition state is provided, wherein a greater image acquisition region of the respective sensor is defined in the first acquisition state than in the second acquisition state,
        the first and the second acquisition state of the first sensor correspond to the first and the second acquisition state of the second sensor, whereby a first and a second acquisition zoom level is provided by the first stereo pair,
        the first and the second acquisition state of the third sensor correspond to the first and the second acquisition state of the fourth sensor, whereby a third and a fourth acquisition zoom level can be provided by the second stereo pair, and
        each acquisition zoom level provides the acquisition of an image corresponding to a field of view defined by the respective acquisition zoom level and the fields of view are each different.

2. The triangulation scanner according to claim 1, wherein an acquisition switching functionality is provided such that upon its execution, one of the acquisition zoom levels is selected.

3. The triangulation scanner according to claim 2, wherein:
    upon selection of the first acquisition zoom level, the image acquisition is provided by means of the first stereo pair in the first acquisition state,
    upon selection of the second acquisition zoom level, the image acquisition is provided by means of the first stereo pair in the second acquisition state,
    upon selection of the third acquisition zoom level, the image acquisition is provided by means of the second stereo pair in the first acquisition state, and
    upon selection of the fourth acquisition zoom level, the image acquisition is provided by means of the second stereo pair in the second acquisition state.

4. The triangulation scanner according to claim 1, wherein:
    the field of view associated with the second acquisition zoom level is smaller than the field of view associated with the first acquisition zoom level,
    the field of view associated with the third acquisition zoom level is smaller than the field of view associated with the second acquisition zoom level, and
    the field of view associated with the fourth acquisition zoom level is smaller than the field of view associated with the third acquisition zoom level.

5. The triangulation scanner according to claim 2, wherein:
    the acquisition zoom functionality is configured such that for the first, the second, the third, and the fourth sensor the same first acquisition state second acquisition state are provided.

6. The triangulation scanner according to claim 1, wherein:
    the optical axis of the first image acquisition unit is aligned in parallel or coaxially to the optical axis of the third image acquisition unit, or
    the optical axis of the second image acquisition unit is aligned in parallel or coaxially to the optical axis of the fourth image acquisition unit.

7. The triangulation scanner according to claim 1, wherein:
    the projection unit has a zoom assembly which may be variably positioned along its optical axis to provide at least two optical projection focal lengths,
    the projection unit has a projection element defining a projection surface for variable and controlled light emission, and
    the triangulation scanner has a projection zoom functionality for activating the projection element such that a first and a second projection state are provided, wherein a larger projection field of view is provided in the first projection state than in the second projection state.

8. The triangulation scanner according to claim 7, wherein for each optical projection focal length, the first and the second projection state are provided.

9. The triangulation scanner according to claim 7, wherein:
a first of the projection focal lengths is less than a second of the projection focal lengths,
a first projection zoom level provided by setting the first projection focal length and the first projection state,
a second projection zoom level provided by setting the first projection focal length and the second projection state,
a third projection zoom level provided by setting the second projection focal length and the first projection state, and
a fourth projection zoom level provided by setting the second projection focal length and the second projection state.

10. The triangulation scanner according to claim 9, further comprising:
a projector switching functionality configured such that upon its execution by selection, one of the projection zoom levels is set.

11. The triangulation scanner according to claim 10, further comprising:
a measurement control functionality configured such that upon its execution, selection of the projector switching is enabled and a selection of the acquisition switching functionality is enabled such that:
the first acquisition zoom level and the first projection zoom level are provided as the first measurement setting,
the second acquisition zoom level and the second projection zoom level are provided as the second measurement setting,
the third acquisition zoom level and the third projection zoom level are provided as the third measurement setting, and
the fourth acquisition zoom level and the fourth projection zoom level are provided as the fourth measurement setting,
wherein the provision of the respective acquisition zoom level and the respective projection zoom level of a measurement setting takes place in a chronologically adapted.

12. A triangulation scanner for measuring an object surface, the triangulation scanner comprising:
a projection unit for projecting a pattern on the object surface;
a first image acquisition unit having a first sensor and a first lens assembly, wherein the first image acquisition unit is aligned and designed to acquire an image depicting the pattern and to provide corresponding image information; and
a control and processing unit to receive the image information and to derive distance measured values from the image information,
wherein:
the first lens assembly has at least one first zoom lens group, which is configured to be positioned variably and with precision along its optical axis, for providing at least two optical acquisition focal lengths, whereby a first and a second acquisition zoom level are provided,
wherein each acquisition zoom level provides the acquisition of an image corresponding to a field of view defined by the respective acquisition zoom level and the fields of view are each different,
the triangulation scanner has a second image acquisition unit having a second sensor and a second lens assembly,
the first and second image acquisition unit form a first stereo pair,
the first and the second lens assembly each have at least one first zoom lens group which is able to be positioned along its optical axis variably and provide at least two optical acquisition focal lengths, whereby a first and a second acquisition zoom level are provided for the first stereo pair, and
wherein each acquisition zoom level provides the acquisition of an image corresponding to a field of view defined by the respective acquisition zoom level and the fields of view are each different.

13. The triangulation scanner according to claim 12, wherein the first and the second lens assembly each have a further second zoom lens group which is configured to be positioned along its optical axis variably and with precision to provide at least three optical acquisition focal lengths, whereby at least one third acquisition zoom level is provided for the first stereo pair.

14. The triangulation scanner according to claim 12, wherein:
the first or the second image acquisition unit is configured such that its sensor and lens assembly are positioned so that a sensor center point of the sensor is offset in relation to the optical axis, such that a distance is present from the sensor center point to the optical axis,
the optical axes of the first and the second lens assembly or the first and the second image acquisition unit are parallel,
a displacement of the field of view in relation to the optical axis results and the offset is applied in such a way that object regions defined by the fields of view of the first and the second image acquisition unit in an object plane essentially correspond, or
a uniform pixel grid is provided in the object plane for the first and the second image acquisition unit.

15. The triangulation scanner according to claim 12, wherein the first image acquisition unit and the second image acquisition unit are referenced in a common external coordinate system and a uniform common voxel grid is provided for the first and the second image acquisition unit.

* * * * *